A. RYDEN.
CONDUIT HANGER.
APPLICATION FILED APR. 21, 1915.
1,210,701. Patented Jan. 2, 1917.
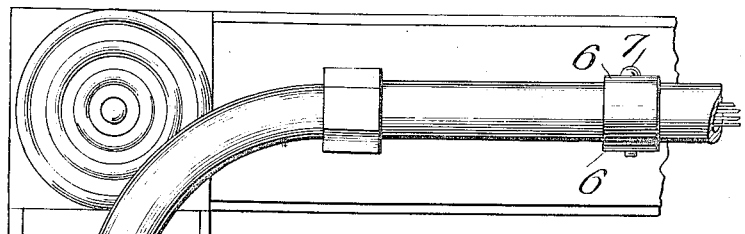
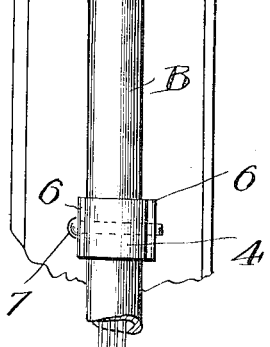
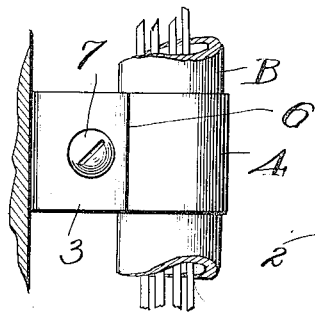
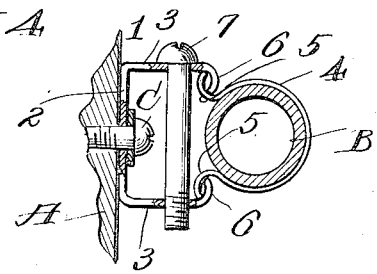
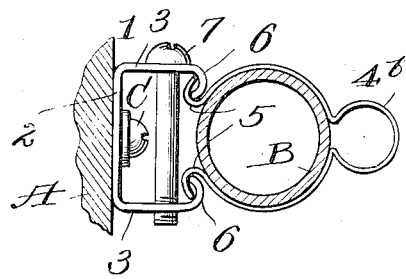
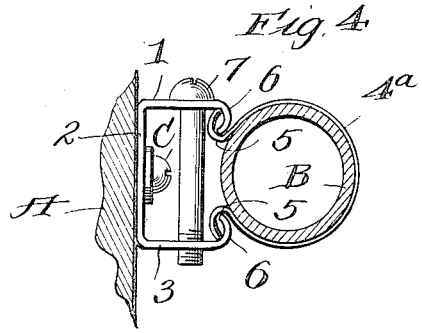
Witnesses
G. A. Vanbuschmidt
W. G. Heilman
Inventor
Axel Ryden
By Miller & Chindahl
Attys

UNITED STATES PATENT OFFICE.

AXEL RYDEN, OF CHICAGO, ILLINOIS, ASSIGNOR TO APPLETON ELECTRIC COMPANY, OF CHICAGO, ILLINOIS, A CORPORATION OF ILLINOIS.

CONDUIT-HANGER.

1,210,701. Specification of Letters Patent. Patented Jan. 2, 1917.

Application filed April 21, 1915. Serial No. 22,726.

*To all whom it may concern:*

Be it known that I, AXEL RYDEN, a citizen of the United States, residing at Chicago, in the county of Cook and State of Illinois, have invented certain new and useful Improvements in Conduit-Hangers, of which the following is a specification.

This invention relates to supports by means of which rigid or flexible conduits of various kinds may be attached to walls, ceilings, window frames, store fronts and other structures.

The object of the invention is to provide means for the purpose stated which shall be simple in construction, easily and quickly associated with the conduit, and which shall effectively support the conduit.

In the accompanying drawings, Figure 1 is a fragmental view of a conduit supported by means embodying the features of my invention. Fig. 2 is another view illustrating the invention. Figs. 3 and 4 are views showing the adaptability of the invention to various sizes of conduits. Fig. 5 is a view showing an alternative construction.

In Fig. 1, A represents a framework upon which a conduit B is to be supported. The conduit hanger comprises a mount 1 preferably formed of sheet-metal and comprising a flat base portion 2 and two flanges 3 extending at an angle from the base portion 2. The base portion 2 is adapted to be secured to the support A or any other suitable structure by means of a screw C extending through an opening in the base. In addition to the mount 1, the conduit hanger comprises a clip 4 comprising a strip of sheet-metal bent to partially encircle the conduit, the ends of the strip being bent to provide hooks 5 which are adapted to engage with hooks 6 on the ends of the flanges 3 of the mount. The mount 1 is preferably formed of heavier sheet metal than that used in the clip 4.

If desired, means may be provided to draw the two flanges 3 toward each other in order to more securely grip the clip 4. Herein I have shown a screw 7 extending loosely through an opening in one of the flanges 3 and having a screw-thread connection with the other flange.

It will be apparent that clips 4 of various sizes corresponding to different sizes of conduits may be used in connection with the mount 1. In Fig. 4 I have shown a clip 4$^a$ of larger size than the clip 4 and adapted to be used in connection with the mount 1.

In order to make the clip more resilient and therefore better adapted to be sprung over the conduit, the length of the strip from which the strip is formed may be increased by providing at the other side of the clip a loop 4$^b$ (Fig. 5).

In practice, the clip is sprung over the conduit B or slipped over the end thereof, if convenient. The flanges 5 of the clip are then slid longitudinally into position beneath the flanges 6 whereby the clip is held in close contact with the conduit. If means (such as the screw 7) has been provided to draw the two flanges 3 together, such means may be operated, if desired, to clamp the clip 4 tightly.

It will be seen that the construction herein shown provides means whereby a conduit may be readily attached to a desired support and as easily detached therefrom when desired, the attaching means being simple and of inexpensive construction.

I claim as my invention:

1. A conduit hanger comprising two sections, one of said sections being a one-piece mount having a base adapted to rest against a support and be attached thereto, and two flanges extending outwardly a material distance from said mount and integral therewith, said flanges having their ends bent inwardly toward each other to form hooks, the other section being adapted to engage the conduit and comprising a main gripping portion having its ends bent outwardly to form hooks and a central loop integral with said main portion and approximately opposite said hooks whereby said main portion will have great resilience and the hooks thereon will frictionally engage the hooks of said mount-piece to support the clip and the conduit.

2. A conduit hanger comprising two sections, one of said sections being a one-piece mount having a flat base adapted to rest against a support and be attached thereto and two flanges extending outwardly a material distance from said base and integral therewith, said flanges having their ends bent inwardly toward each other to form hooks, means adapted to engage said flanges to draw said hooks and flanges together, the other section being adapted to engage the conduit and having end portions adapted to be engaged by said hooks.

3. A conduit hanger comprising two sections, one of said sections being a one-piece mount having a flat base adapted to rest against a support and be attached thereto by suitable means, said mount further comprising two flanges extending outwardly a material distance from said base and having their ends bent inwardly toward each other to form hooks, the other section being a clip adapted to embrace the conduit and having its end portions bent outwardly away from each other to form complementary hooks, whereby said complementary hooks engage said first mentioned hooks to secure said clip to said mount.

4. A conduit hanger comprising two sections, one of said sections being a one-piece mount having a base adapted to be attached to a support and two end portions extending outwardly from said base and integral therewith, the other section being adapted to encircle a conduit and having two end portions spaced from each other, the two end portions on one of said sections being adapted to interlock with the two end portions on the other section for securing the two sections together, and a screw engaging the two end portions of one of said sections only and arranged to draw said portions toward each other whereby to render the engagement between the interlocking parts of the two sections more secure and to tighten the conduit-encircling section about the conduit.

In testimony whereof, I hereunto set my hand in the presence of two witnesses.

AXEL RYDEN.

In the presence of—
GEORGE L. CHINDAHL,
C. PAUL PARKER.